United States Patent
Qin

(10) Patent No.: US 9,746,757 B2
(45) Date of Patent: Aug. 29, 2017

(54) DISPLAY PANEL AND PROJECTION DISPLAY DEVICE

(71) Applicant: BOE TECHNOLOGY GROUP CO., LTD., Beijing (CN)

(72) Inventor: Guangkui Qin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/087,279

(22) Filed: Mar. 31, 2016

(65) Prior Publication Data

US 2016/0349607 A1 Dec. 1, 2016

(30) Foreign Application Priority Data

May 29, 2015 (CN) .......................... 2015 1 0290187

(51) Int. Cl.
| | |
|---|---|
| *G03B 21/20* | (2006.01) |
| *G02B 5/00* | (2006.01) |
| *G02F 1/1335* | (2006.01) |
| *G02B 5/02* | (2006.01) |
| *G03B 21/56* | (2006.01) |
| *G02B 5/30* | (2006.01) |
| *G02B 5/20* | (2006.01) |

(52) U.S. Cl.
CPC ......... *G03B 21/2073* (2013.01); *G02B 5/003* (2013.01); *G02B 5/0205* (2013.01); *G02F 1/133504* (2013.01); *G02F 1/133512* (2013.01); *G03B 21/56* (2013.01); *G02B 5/201* (2013.01); *G02B 5/3016* (2013.01); *G02B 5/3083* (2013.01)

(58) Field of Classification Search
CPC .. G03B 21/006; G03B 21/28; G03B 21/2073; H01L 51/525; H01L 51/5012; H01L 51/5268; H01L 51/5284; G02B 27/283; G02B 27/286

See application file for complete search history.

(56) References Cited

U.S. PATENT DOCUMENTS

| | | | | |
|---|---|---|---|---|
| 2007/0285000 | A1* | 12/2007 | Lim | .................. G02F 1/133603 313/501 |
| 2008/0129189 | A1* | 6/2008 | Cok | ....................... B82Y 20/00 313/503 |

\* cited by examiner

*Primary Examiner* — Sultan Chowdhury
(74) *Attorney, Agent, or Firm* — Harness, Dickey & Pierce, P.L.C.

(57) ABSTRACT

The present disclosure provides a display panel, including: a reflector; a phase retarder configured to change a polarization direction of a light beam passing through the phase retarder; a light-absorbing black matrix configured to absorb the light beam; and a polarization scattering film. After passing through the polarization scattering film, a polarized light beam from a projector is transmitted along an original light path, then the polarized light beam is transmitted through the phase retarder, reflected by the reflector and directed again to the polarization scattering film so as to be scattered. After passing through the polarization scattering film, a light beam with a polarization direction different from the polarized light beam from the projector is scattered by the polarization scattering film and then absorbed by the light-absorbing black matrix.

16 Claims, 2 Drawing Sheets

30

DISPLAY PANEL AND PROJECTION DISPLAY DEVICE

CROSS-REFERENCE TO RELATED APPLICATION

The present application claims a priority of the Chinese patent application No. 201510290187.8 filed on May 29, 2015, which is incorporated herein by reference in its entirety.

TECHNICAL FIELD

The present disclosure relates to the field of display technology, in particular to a display panel and a projection display device.

BACKGROUND

In recent years, along with the development of the key technologies for liquid crystal display (LCD) and digital light processing (DLP), an electronic projection display system with a large-size screen and high brightness has been widely used for displaying multimedia information. Projectors, LCD panels and plasma display panels (PDPs) have attracted more and more attentions in the market. For a display device with a size smaller than 30 inches, the LCD panel has become a mainstream product in the market; for a display device with a size within a range from 30 inches to 70 inches, the PDP has become a mainstream product; and for a display device with a size greater than 70 inches, the projector has become a mainstream product.

However, when an image is projected by the projector onto a scattering surface, a projected light beam may be adversely affected by an ambient light beam, and a gamut and a contrast of the image may be degraded when the projected light beam is mixed with the ambient light beam and then scattered. As a result, a display effect will be adversely affected.

SUMMARY

An object of the present disclosure is to provide a display panel and a projection display device, so as to prevent an ambient light beam from interfering with an image displayed by the projection display device, thereby to improve a display effect.

In one aspect, the present disclosure provides in some embodiments a display panel, comprising: a reflector; a phase retarder arranged on the reflector and configured to change a polarization direction of a light beam passing through the phase retarder; a light-absorbing black matrix arranged on the phase retarder and configured to absorb the light beam; and a polarization scattering film arranged on the light-absorbing black matrix, wherein a polarized light beam emitted by a projector passes through the polarization scattering film and the phase retarder in sequence, and then reflected by the reflector and directed again to the polarization scattering film, so as to be scattered by the polarization scattering film, wherein the polarized light beam having passed through the polarization scattering film is transmitted along an original light path, and the polarization direction of the polarized light beam having passed through the phase retarder is changed by the phase retarder, and after passing through the polarization scattering film, a light beam with a polarization direction different from the polarized light beam emitted by the projector is scattered by the polarization scattering film and then absorbed by the light-absorbing black matrix.

According to the display panel in the embodiments of the present disclosure, the light beams may be selectively transmitted through the polarization scattering film. In other words, the polarized light beam in one polarization direction may pass through the polarization scattering film and be transmitted along the original light path, while the polarized light beam in another polarization direction may pass through the polarization scattering film and be scattered, so as to be absorbed by the light-absorbing black matrix arranged behind the polarization scattering film. The polarization direction of the polarized light beam transmitted along the original light path is changed by the phase retarder, then the polarized light beam is reflected by the reflector and directed again to the polarization scattering film so as to be scattered, thereby to enable a viewer to view an image being displayed. Through the cooperation of the polarization scattering film with the phase retarder, it is able to merely allow the polarized light beam from the projector to arrive at the display panel and thus be displayed on the display panel, and to ensure an ambient light beam to be scattered by the polarization scattering film, thereby to prevent the ambient light beam from interfering with the image, and improve the display effect.

Alternatively, the polarization scattering film includes two substrates arranged opposite to each other to form a cell, a liquid crystal layer arranged between the two substrates, and a polymer network configured to disorganize alignment directions of liquid crystal molecules in the liquid crystal layer. In this way, the polarization scattering film has a good polarization scattering effect.

Alternatively, the phase retarder is a quarter-wave phase retarder, so as to change the polarization direction of the polarized light beam.

Alternatively, the light-absorbing black matrix is a peep-proof light-absorbing black matrix.

Alternatively, an interval between the adjacent light-absorbing black matrices is a line width within a range from 1 to 100 μm, and a height of the light-absorbing black matrix is within a range from 1 to 1000 μm.

Alternatively, the liquid crystal molecules are arranged parallel to a plane perpendicular to the two substrates.

Alternatively, the polarization scattering film is formed by curing the aligned liquid crystal molecules with a polarized ultraviolet light beam.

Alternatively, the line width is 10μ and the height is 100 μm, or the line width is 20 μm and the height is 200 μm, or the line width is 30 μm and the height is 300 μm, or the line width is 40 μm and the height is 400 μm, or the line width is 50 μm and the height is 500 μm, or the line width is 60 μm and the height is 600 μm, or the line width is 70 μm and the height is 700 μm, or the line width is 80 μm and the height is 800 μm, or the line width is 90 μm and the height is 900 μm, or the line width is 100 μm and the height is 1000 μm.

In another aspect, the present disclosure provides in some embodiments a projection display device including a projector and the above-mentioned display panel.

According to the embodiments of the present disclosure, the light beams may be selectively transmitted through the polarization scattering film. To be specific, the polarized light beam in one polarization direction may pass through the polarization scattering film and be transmitted along the original light path, while the polarized light beam in another polarization direction may pass through the polarization scattering film and be scattered, so as to be absorbed by the light-absorbing black matrix arranged behind the polarization scattering film. The polarization direction of the polarized light beam transmitted along the original light path is changed by the phase retarder, then the polarized light beam is reflected by the reflector and directed again to the polarization scattering film so as to be scattered, thereby to enable a viewer to view an image being displayed. Through the cooperation of the polarization scattering film with the phase retarder, it is able to merely allow the polarized light beam from the projector to arrive at the display panel and thus be displayed on the display panel, and to ensure an ambient light beam to be scattered by the polarization scattering film, thereby to prevent the ambient light beam from interfering with the image, and improve the display effect.

Figure 1:
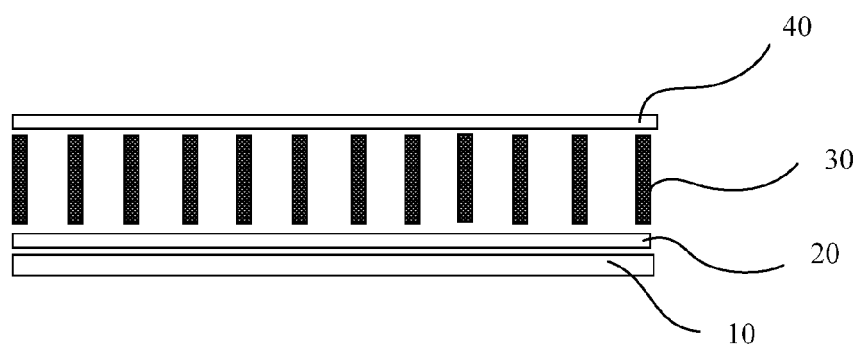
FIG. 1 is a schematic view showing a display panel according to one embodiment of the present disclosure.

REFERENCE SIGN LIST 10 reflector
20 phase retarder
30 light-absorbing black matrix
40 polarization scattering film
41 first substrate
42 second substrate
43 liquid crystal layer
44 polymer network

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "a" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

In order to improve a display effect of a conventional projection display device, the present disclosure provides in some embodiments a display panel and a projection display device. According to the embodiments of the present disclosure, a polarization scattering film is provided so as to merely reflect a light beam from a projector and scatter an ambient light beam, thereby to improve image quality as well the display effect. In order to make the objects, the advantages and the technical solutions of the present disclosure more apparent, the present disclosure will be further described hereinafter in conjunction with the drawings and embodiments.

Figure 2:
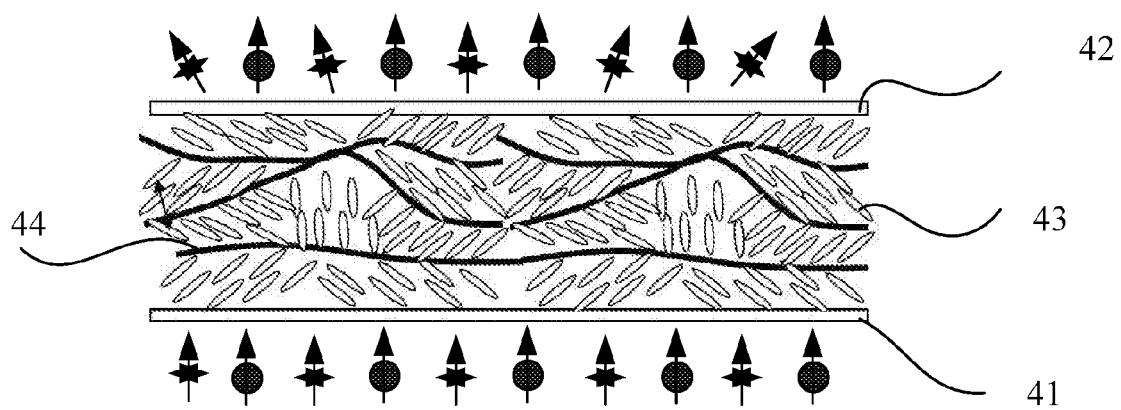
FIG. 2 is a schematic view showing a polarization scattering film according to one embodiment of the present disclosure.
Figure 3:
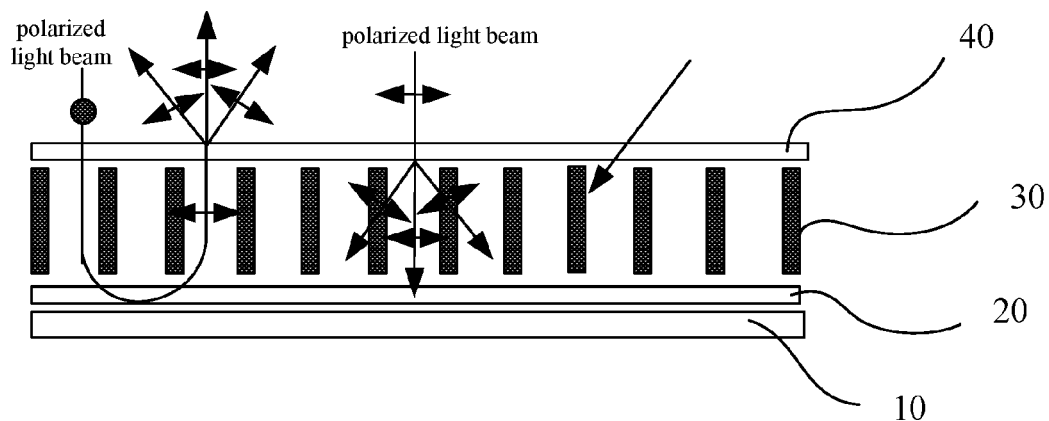
FIG. 3 is a schematic view showing an operating state of the display panel according to one embodiment of the present disclosure.

FIG. 1 is a schematic view showing to the display panel according to one embodiment of the present disclosure; FIG. 2 is a schematic view showing the polarization scattering film 40 according to one embodiment of the present disclosure; and FIG. 3 is a schematic view showing an operating state of the display panel according to one embodiment of the present disclosure.

The display panel in some embodiments of the present disclosure includes: a reflector 10; a phase retarder 20 arranged on the reflector 10 and configured to change a polarization direction of a light beam passing through the phase retarder 20; a light-absorbing black matrix 30 arranged on the phase retarder 20 and configured to absorb the light beam; and a polarization scattering film 40 arranged on the light-absorbing black matrix 30. After passing through the polarization scattering film 40, a polarized light beam from a projector is transmitted along an original light path, the polarization direction of the polarized light beam is changed by the phase retarder 20, and the polarized light beam is then reflected by the reflector 10 and directed again to the polarization scattering film 40 so as to be scattered. After passing through the polarization scattering film 40 again, a light beam with a polarization direction different from the polarized light beam from the projector is scattered by the polarization scattering film 40 and then absorbed by the light-absorbing black matrix 30.

In some embodiments of the present disclosure, the display panel includes the reflector 10, the phase retarder 20 arranged on the reflector 10, the light-absorbing black matrix 30 arranged on the phase retarder 20, and the polarization scattering film 40 arranged on the light-absorbing black matrix 30. The polarization scattering film 40 allows the polarized light beam from the projector to pass therethrough, and scatters the light beam which is reflected by the reflector and the polarization direction of which is changed by the phase retarder 20.

According to the embodiments of the present disclosure, the light beams may be selectively transmitted through the polarization scattering film 40. To be specific, as shown in FIG. 2, the polarized light beam in one polarization direction may pass through the polarization scattering film 40 and be transmitted along the original light path, while the polarized light beam in another polarization direction may pass through the polarization scattering film 40 and be scattered, so as to be absorbed by the light-absorbing black matrix 30 arranged behind the polarization scattering film 40. The polarization direction of the polarized light beam transmitted along the original light path is changed by the phase retarder 20, then the polarized light beam is reflected by the reflector and directed again to the polarization scattering film so as to be scattered, thereby to enable a viewer to view an image being displayed. In the above procedure, through the cooperation of the polarization scattering film 40 with the phase retarder 20, it is able to merely allow the polarized light beam from the projector to arrive at the display panel and thus be displayed on the display panel, and to ensure an ambient light beam to be scattered by the polarization scattering film 40, thereby to prevent the ambient light beam from interfering with the image, and improve the display effect.

For ease of understanding, a structure and an operating principle of the display panel will be described hereinafter in conjunction with the drawings.

As shown in FIG. 1, the display panel in the embodiments of the present disclosure includes the reflector 10 having a reflection function and the phase retarder 20 arranged on the reflector 10. The phase retarder 20 is a quarter-wave phase retarder. The light beam passing through the phase retarder 20 is transmitted to and reflected by the reflector 10 and directed again to the phase retarder 20, and at this time, the polarization direction of the light beam is changed by 90°. Then, the light beam passes through the light-absorbing black matrix 30 again and arrives at the polarization scattering film 40 so as to be scattered, thereby to enable the display panel to display an image and enable the viewer to view the image at different viewing angles. In other words, as shown in FIG. 3, the polarization direction of the light beam from the projector is not changed when the light beam passes through the polarization scattering film for the first time, and the polarization direction of the light beam is rotated by 90° after the light beam passes through the quarter-wave phase retarder 20 and reflected by the reflector 10. At this time, the light beam is scattered when it passes through the polarization scattering film for a second time, so as to form an image.

The polarization scattering film 40 is made of a material capable of allowing the light beams in different polarization directions to pass therethrough selectively. As shown in FIG. 2 the polarization scattering film 40 includes: two substrates (i.e., a first substrate 41 and a second substrate 42) arranged opposite to each other to form a cell; a liquid crystal layer 43 arranged between the two substrates; and a polymer network 44 capable of disorganizing alignment directions of liquid crystal molecules in the liquid crystal layer 43. The liquid crystal layer 43 is filled between the first substrate 41 and the second substrate 2, and the alignment directions of the liquid crystal molecules in the liquid crystal layer 43 are changed by the polymer network 44. To be specific, the alignment directions of the liquid crystal molecules are disorganized under the effect of the polymer network 44. At this time, although with the disorganized alignment directions, the liquid crystal molecules are arranged parallel to a plane of FIG. 2. Hence, when passing through the polarization scattering film, the polarized light beam with its polarization direction perpendicular to the plane of FIG. 2 (e.g., the polarized light beam shown by an arrow with a circle) has a refractive index of n0, i.e., the polarized light beam is not scattered. However, when passing through the polarization scattering film, the polarized light beam with its polarization direction parallel to the plane of FIG. 2 (e.g., the polarized light beam shown by an arrow with a star in FIG. 2) will be scattered due to the disorganized liquid crystal molecules, so it is able for the viewer to view the image on the display panel. The polarization scattering film 40 may be formed by curing the aligned liquid crystal molecules with a polarized ultraviolet light beam.

Figure 4:
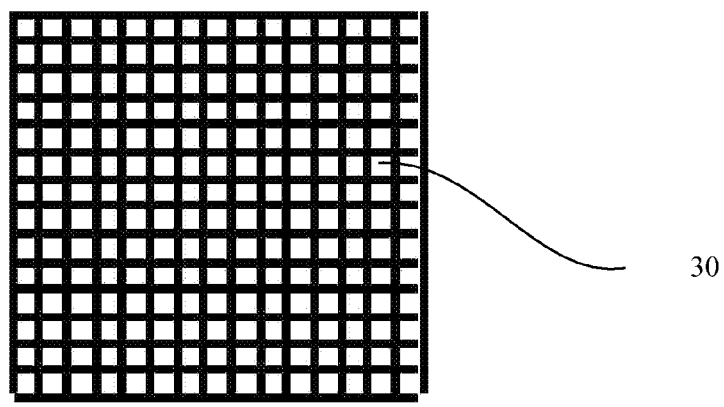
FIG. 4 is a schematic view showing a light-absorbing black matrix of the display panel according to one embodiment of the present disclosure.

As shown in FIG. 4, the light-absorbing black matrix 30 is a peep-proof light-absorbing black matrix. To be specific, a conventional peep-proof film may be used as the light-absorbing black matrix. However, in order to ensure the display effect, a line width (i.e. an interval between the adjacent light-absorbing black matrices) may be narrow (e.g., the line width may be within a range from 1 to 100 μm, and a height of the light-absorbing black matrix may be within a range from 1 to 1000 μm). In other words, the light-absorbing black matrices may be arranged in such a manner as to enable the line width to be any value within the range from 1 to 100 μm and enable the height to be any value within the range from 1 to 1000 μm. For example, the line width is 10μ and the height is 100 μm, or the line width is 20 μm and the height is 200 μm, or the line width is 30 μm and the height is 300 μm, or the line width is 40 μm and the height is 400 μm, or the line width is 50 μm and the height is 500 μm, or the line width is 60 μm and the height is 600 μm, or the line width is 70 μm and the height is 700 μm, or the line width is 80 μm and the height is 800 μm, or the line width is 90 μm and the height is 900 μm, or the line width is 100 μm and the height is 1000 μm.

Figure 5:
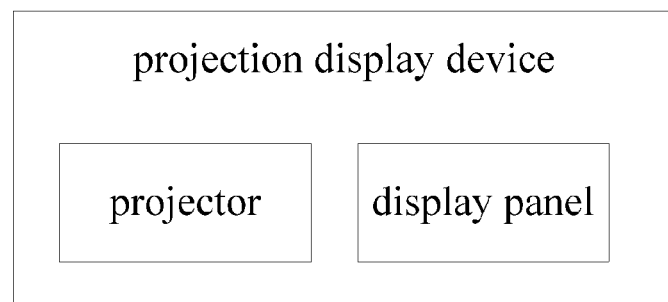
FIG. 5 is a schematic view showing a projection display device according to one embodiment of the present disclosure.

As shown in FIG. 5, the present disclosure further provides in some embodiments a projection display device including a projector and the above-mentioned display panel.

According to the embodiments of the present disclosure, the light beams may be selectively transmitted through the polarization scattering film 40. To be specific, as shown in FIG. 2, the polarized light beam in one polarization direction may pass through the polarization scattering film 40 and be transmitted along the original light path, while the polarized light beam in another polarization direction may pass through the polarization scattering film 40 and be scattered, so as to be absorbed by the light-absorbing black matrix 30 arranged behind the polarization scattering film 40. The polarization direction of the polarized light beam transmitted along the original light path is changed by the phase retarder 20, then the polarized light beam is reflected by the reflector and directed again to the polarization scattering film so as to be scattered, thereby to enable a viewer to view an image being displayed. Through the cooperation of the polarization scattering film 40 with the phase retarder 20, it is able to merely allow the polarized light beam from the projector to arrive at the display panel and thus be displayed on the display panel, and to ensure an ambient light beam to be scattered by the polarization scattering film 40, thereby to prevent the ambient light beam from interfering with the image, and improve the display effect.

The above are merely the preferred embodiments of the present disclosure. It should be appreciated that, a person skilled in the art may make further modifications and improvements without departing from the spirit of the present disclosure, and these modifications and improvements shall also fall within the scope of the present disclosure.

What is claimed is:

1. A display panel, comprising:
   a reflector;
   a phase retarder arranged on the reflector and configured to change a polarization direction of a light beam passing through the phase retarder;
   a light-absorbing black matrix arranged on the phase retarder and configured to absorb the light beam; and
   a polarization scattering film arranged on the light-absorbing black matrix,
   wherein a polarized light beam emitted by a projector passes through the polarization scattering film and the phase retarder in sequence, and then reflected by the reflector and directed again to the polarization scattering film, so as to be scattered by the polarization scattering film, wherein the polarized light beam having passed through the polarization scattering film is transmitted along an original light path, and the polarization direction of the polarized light beam having passed through the phase retarder is changed by the phase retarder, and after passing through the polarization scattering film, a light beam with a polarization direction different from the polarization direction of the polarized light beam emitted by the projector is scattered by the polarization scattering film and then absorbed by the light-absorbing black matrix.

2. The display panel according to claim 1, wherein the polarization scattering film comprises two substrates arranged opposite to each other to form a cell, a liquid crystal layer arranged between the two substrates, and a polymer network configured to disorganize alignment directions of liquid crystal molecules in the liquid crystal layer.

3. The display panel according to claim 1, wherein the phase retarder is a quarter-wave phase retarder.

4. The display panel according to claim 1, wherein the light-absorbing black matrix is a peep-proof light-absorbing black matrix.

5. The display panel according to claim 4, wherein an interval between the adjacent light-absorbing black matrices is a line width within a range from 1 to 100 µm, and a height of the light-absorbing black matrix is within a range from 1 to 1000 µm.

6. The display panel according to claim 2, wherein the liquid crystal molecules are arranged parallel to a plane perpendicular to the two substrates.

7. The display panel according to claim 2, wherein the polarization scattering film is formed by curing the aligned liquid crystal molecules with a polarized ultraviolet light beam.

8. The display panel according to claim 5, wherein the line width is 10µ and the height is 100 µm, or the line width is 20 µm and the height is 200 µm, or the line width is 30 µm and the height is 300 µm, or the line width is 40 µm and the height is 400 µm, or the line width is 50 µm and the height is 500 µm, or the line width is 60 µm and the height is 600 µm, or the line width is 70 µm and the height is 700 µm, or the line width is 80 µm and the height is 800 µm, or the line width is 90 µm and the height is 900 µm, or the line width is 100 µm and the height is 1000 µm.

9. A projection display device, comprising the display panel according to claim 1 and the projector.

10. The projection display device according to claim 9, wherein the polarization scattering film comprises two substrates arranged opposite to each other to form a cell, a liquid crystal layer arranged between the two substrates, and a polymer network configured to disorganize alignment directions of liquid crystal molecules in the liquid crystal layer.

11. The projection display device according to claim 9, wherein the phase retarder is a quarter-wave phase retarder.

12. The projection display device according to claim 9, wherein the light-absorbing black matrix is a peep-proof light-absorbing black matrix.

13. The projection display device according to claim 12, wherein an interval between the adjacent light-absorbing black matrices is a line width within a range from 1 to 100 µm, and a height of the light-absorbing black matrix is within a range from 1 to 1000 µm.

14. The projection display device according to claim 10, wherein the liquid crystal molecules are arranged parallel to a plane perpendicular to the two substrates.

15. The projection display device according to claim 10, wherein the polarization scattering film is formed by curing the aligned liquid crystal molecules with a polarized ultraviolet light beam.

16. The projection display device according to claim 13, wherein the line width is 10µ and the height is 100 µm, or the line width is 20 µm and the height is 200 µm, or the line width is 30 µm and the height is 300 µm, or the line width is 40 µm and the height is 400 µm, or the line width is 50 µm and the height is 500 µm, or the line width is 60 µm and the height is 600 µm, or the line width is 70 µm and the height is 700 µm, or the line width is 80 µm and the height is 800 µm, or the line width is 90 µm and the height is 900 µm, or the line width is 100 µm and the height is 1000 µm.

* * * * *